(12) United States Patent
Stark

(10) Patent No.: US 9,210,837 B2
(45) Date of Patent: Dec. 15, 2015

(54) ROLLER CYLINDER AND A BAND RING SEGMENT INTENDED THEREFORE

(75) Inventor: Crister Stark, Väderstad (SE)

(73) Assignee: Vaderstad Holding AB, Väderstad (SE)

( * ) Notice: Subject to any disclaimer, the term of this patent is extended or adjusted under 35 U.S.C. 154(b) by 201 days.

(21) Appl. No.: 13/882,604

(22) PCT Filed: Oct. 31, 2011

(86) PCT No.: PCT/SE2011/051297
§ 371 (c)(1),
(2), (4) Date: May 14, 2013

(87) PCT Pub. No.: WO2012/060770
PCT Pub. Date: May 10, 2012

(65) Prior Publication Data
US 2013/0220654 A1      Aug. 29, 2013

(30) Foreign Application Priority Data

Nov. 1, 2010   (SE) ...................... 1051141

(51) Int. Cl.
*A01B 29/02*    (2006.01)
*A01B 29/04*    (2006.01)
*A01B 49/02*    (2006.01)

(52) U.S. Cl.
CPC ............... *A01B 29/02* (2013.01); *A01B 29/041* (2013.01); *A01B 49/027* (2013.01)

(58) Field of Classification Search
CPC ........ A01B 29/00; A01B 29/02; A01B 29/04; A01B 29/014
USPC ......... 172/150, 170, 174, 349, 518, 557, 535, 172/552, 556
See application file for complete search history.

(56) References Cited

U.S. PATENT DOCUMENTS 2,040,710 A     6/1935   Riehl
2,211,675 A *   8/1940   Rushbrook ................... 172/572
(Continued)

FOREIGN PATENT DOCUMENTS

DE     88 11 755 U1    11/1988
DE     44 06 802 A1     9/1995
DE     29714274 U1     11/1997
DE     29722141 U1      4/1998
EP      0998185 B1      3/2005
(Continued)

OTHER PUBLICATIONS

Extended European Search Report dated Jan. 15, 2015 for Application No. EP 11 83 8321.

*Primary Examiner* — Matthew D Troutman
(74) *Attorney, Agent, or Firm* — Birch, Stewart, Kolasch & Birch, LLP

(57) ABSTRACT

The invention relates to a roller cylinder (1) comprising band rings (6) which are attached to a center axis (17, 17a, 17b). The roller cylinder comprises at least two band ring segments (14, 14a, 14b) consisting of an outer, substantially circular portion (15), an inner portion (16) and a radial portion (18) extending substantially radially between the inner and outer portions, said inner portions of the band ring segments being fixed by means of fastening means, such as screws (19, 20, 19a, 20a, 21a, 19b, 20b, 21b), to the center axis and abut the center axis at least at the attachment points of the fastening means between the inner portion of the band ring segments and the center axis. The invention also relates to a band ring segment included in a roller cylinder provided with band rings.

18 Claims, 5 Drawing Sheets

(56) References Cited

U.S. PATENT DOCUMENTS

| | | | |
|---|---|---|---|
| 4,088,195 A | | 5/1978 | van der Lely |
| 4,298,070 A | * | 11/1981 | van der Lely ................. 172/123 |
| 2012/0241181 A1 | * | 9/2012 | Horsch ......................... 172/518 |

FOREIGN PATENT DOCUMENTS

| | | |
|---|---|---|
| GB | 219892 A | 8/1924 |
| WO | WO 85/05246 A1 | 12/1985 |
| WO | WO 97/40660 A1 | 11/1997 |

* cited by examiner

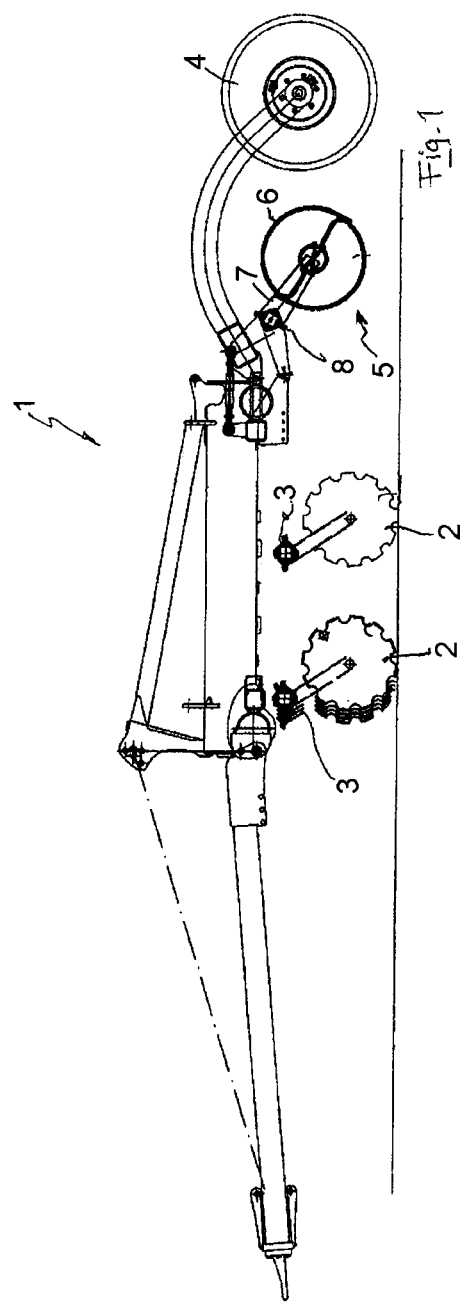

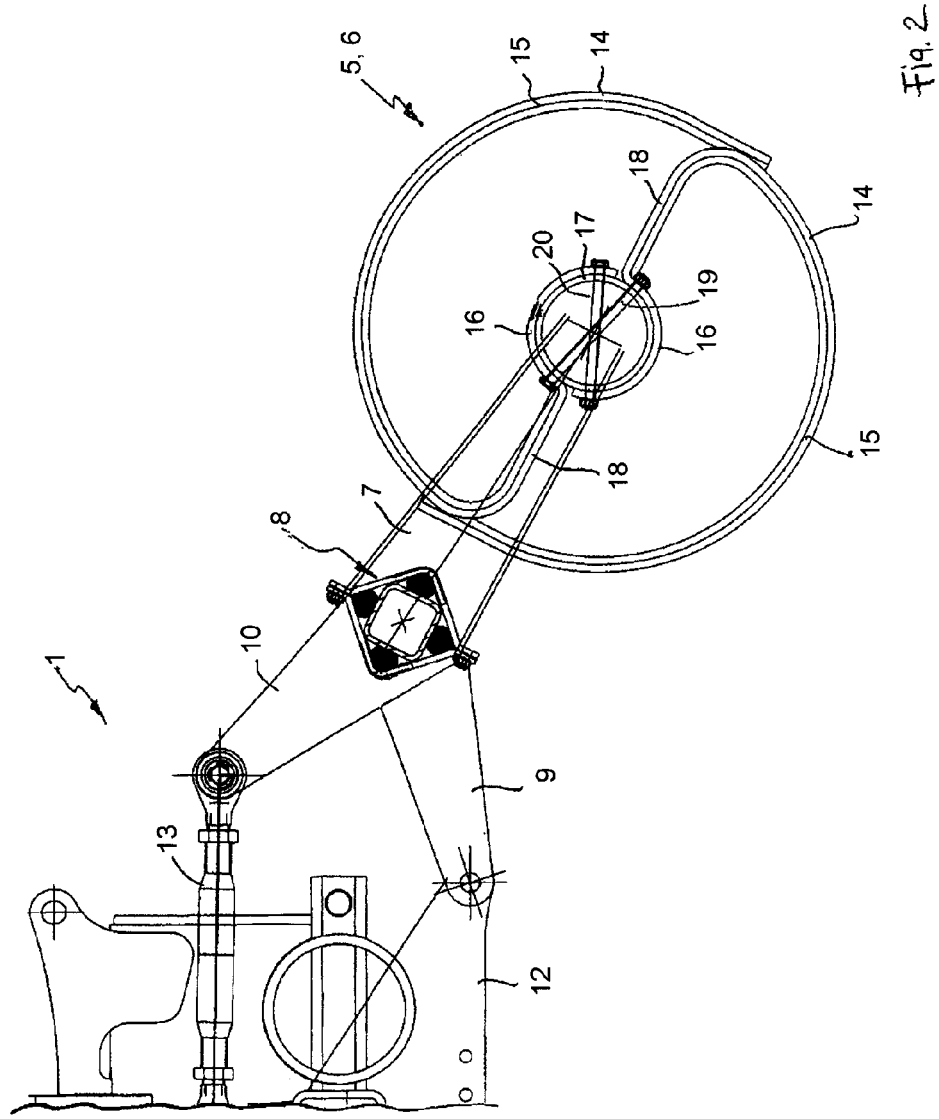

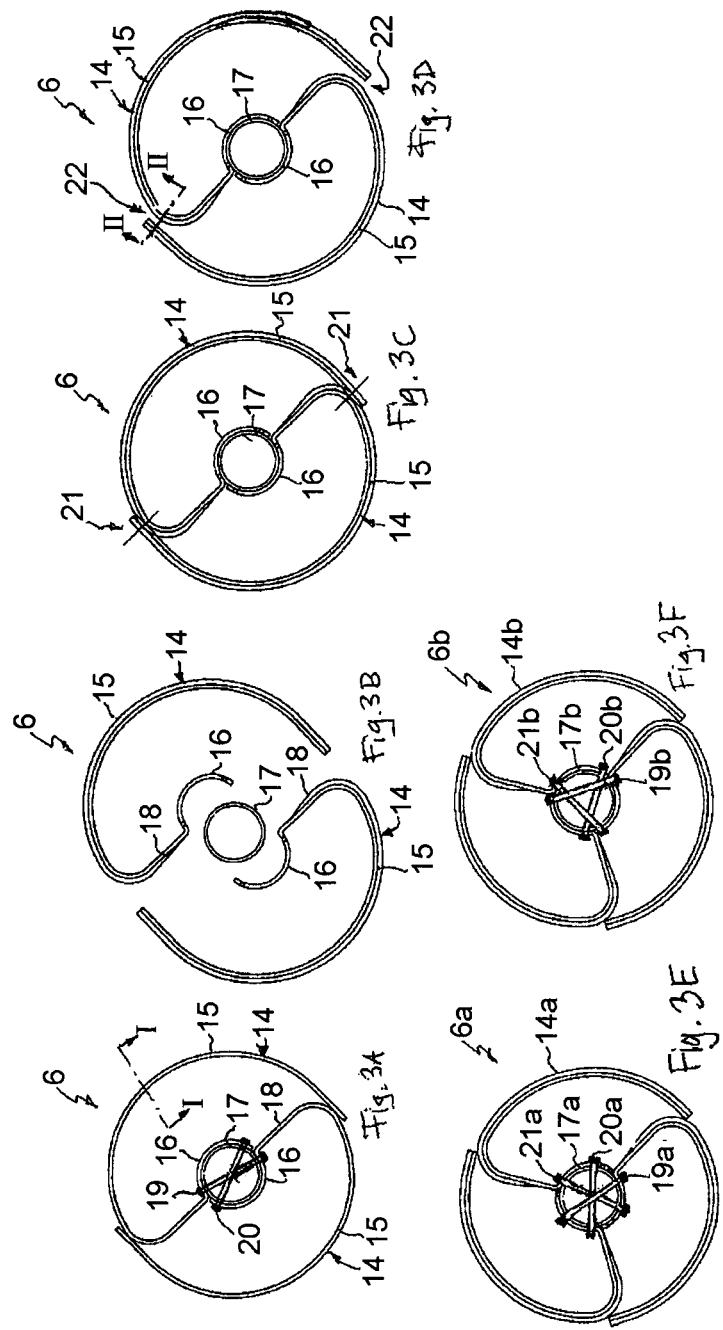

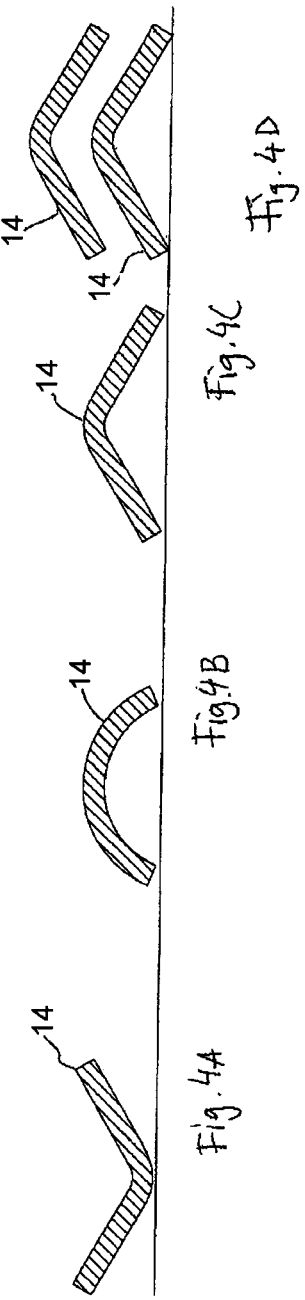

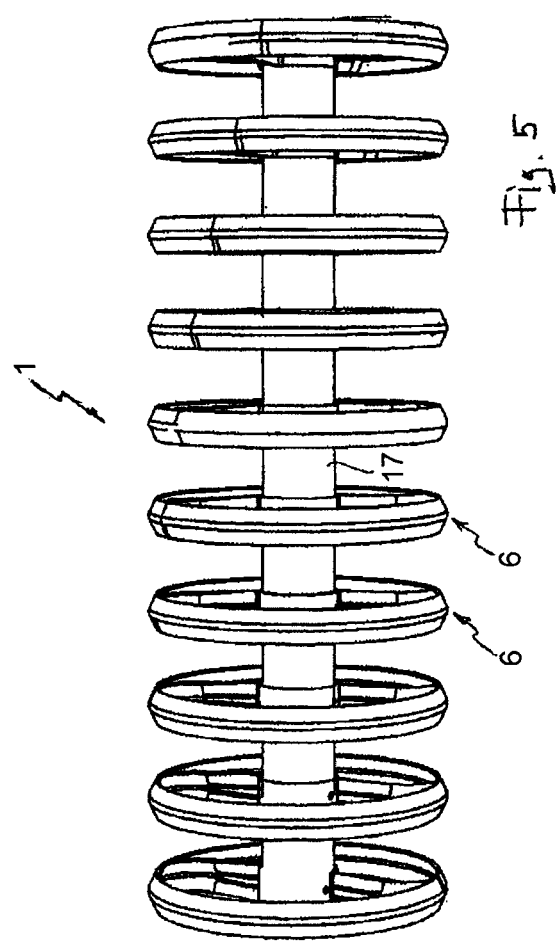

US 9,210,837 B2

ROLLER CYLINDER AND A BAND RING SEGMENT INTENDED THEREFORE

The invention relates to a roller cylinder in an agricultural machine according to the preamble of claim 1. The invention also relates to a band ring segment for such a roller cylinder according to the preamble of claim 12.

PRIOR ART

For a long time different types of roller cylinders, packing cylinders and the like have been used within agriculture. These may be manufactured of cast iron, be steel profiles, of gratings or for instance consist of a series of wheels which have been mounted on an axis or are mounted free from each other. These wheels may be joined in different ways, for instance as shown in WO 97/40660 or WO 85/05246. The purpose is usually to support and carry a tool or a tool means so that a certain working depth is obtained. In certain cases, one wants a heavy roller cylinder or a packing cylinder in order to re-compact the ground in a desired manner. In other cases one wants a light roller cylinder intended for light earth or is its function substantially intended to carry a tool. A light construction, which may perform the task aimed at, often has a lower cost. A roller cylinder previously known according to the preamble of claim 1 is shown in EP 0 998 185 by which the mounting of the ring segments is complicated and not reliable in regard to the structural strength of the roller cylinder.

In many cases, a roller cylinder or a compacting cylinder has to manage a lot of different tasks. The roller cylinder is to be able to support the tool or the working means such as discs, cultivator pins, drill coulters etc. so that a certain working depth is achieved. The roller cylinder may also manage to function on different types of soil and on grounds which may be rich of stones. Parts of the world's agriculture are rich of stones, which is a challenge as machines are often damaged by a large presence of stones or by isolated big stones.

An object of the roller cylinder is also to re-compact the ground to get a smooth field surface or a surface with a certain structure, alternatively to get the weed to grow after cultivation. Further, the roller cylinder may be used to give the field a suitable ability to absorb water which sometimes falls in large amounts. Often, it is a combination of a series of conditions which could be served by one construction.

Another condition creating great difficulties is to get a roller cylinder to function also during wet conditions. An important parameter is that a small surface of the roller cylinder gets in contact with the earth so that the wet earth only adheres to as small a surface as possible. Often, the roller cylinders are manufactured of steel discs, which halves are joined two by two and mounted at a distance from each other. These solutions function well when it is dry but they have the drawback that a very large total sheet surface is exposed and that it is difficult to get these roller cylinders to run clean when it is wet. Other roller cylinders consist of band rings which are screwed to brackets protruding from the centre axis. These are often complicated in their construction and cumbersome to mount.

THE OBJECT OF THE INVENTION

The object of the invention is to provide a roller cylinder, which removes the problems mentioned above. An object is also to provide a band ring segment for such a roller cylinder.

BRIEF DISCLOSURE OF THE INVENTION

The object is obtained by a roller cylinder according to the characterizing part of claim 1 and by a band ring segment according to the characterizing part of claim 11.

The sub-claims relate to advantageous embodiments of the invention.

A roller cylinder according to the invention consists of a number of band ring segments mounted on a centre axis, wherein at least two band ring segments are mounted together to form a band ring. Each of these band ring segments is manufactured of a strip steel or a flat bar steel and the band ring segments are mounted after each other in the circumferential direction on a centre axis. This construction has many advantages and may also be manufactured in many designs with different profile appearances, diameters, band widths, flexibility, etc. The segments may well be manufactured in an automatic process and hardened to high strength and flexibility. Then, the segments can easily be mounted on the centre axis, which suitably has the shape of a tube, circular, square, or any other suitable shape, which may be cut and holed during an automatic process, which implies that pertinent parts may be manufactured in a production which is rationalized to a great extent, and as the construction also will be comparatively light, the costs will be favourable as compared to other constructions previously known.

With the roller cylinder with band ring segments according to the invention, the contact surface against the ground will be small and the construction has in other respects small surfaces to which wet earth may stick.

The band ring segments of the roller cylinder according to the invention may be manufactured/mounted in different designs.

A special advantage with the construction of the band rings according to the invention is that as the segments are profiled, a segment abutting the ground will steer towards its adjacent segment and the construction will therefore be durable even if each segment is made of a comparatively thin and hence light material.

DESCRIPTION OF DRAWINGS

The invention is described more in detail below with reference to the enclosed drawings, which show preferred embodiments.

FIG. 1 shows a side view of an agricultural machine with a roller cylinder, which has band rings according to the invention.

FIG. 2 shows a partial enlarged view of the rear part of the agricultural machine in FIG. 1, which view illustrates the construction of a ring with the roller cylinder.

FIGS. 3A-F show side views of different embodiments of the band rings according to the invention.

FIGS. 4A-C show cross-sections of the band ring taken along the line I-I in FIG. 3A.

FIGS. 4D shows a cross-section of the band ring taken along the line II-II in FIG. 3A.

FIG. 5 shows a side view of a roller cylinder with band rings according to the invention.

DESCRIPTION OF PREFERRED EMBODIMENTS

FIG. 1 shows a side view of an agricultural machine 1 having oblique discs 2 with rubber springs 3 for working the ground. At the very back but in front of the transport wheel 4 of the machine there is a roller cylinder 5 according to the invention with band rings 6. The roller cylinder 5 has a device such as a crank or a rigging screw 13 or the like for the adjustment of the height of the roller cylinder 5. The roller cylinder 5 is journalled in schematically shown arms 7 which are arranged on each side, which arms at their opposite ends are journalled in rubber spring devices 8, which makes the roller cylinder 5 flexible so it may follow the unevenness of the ground and spring away when hitting stones, for example.

FIG. 2 shows a more detailed view of the roller cylinder 5 according to the invention with the band rings 6. The rubber spring means 8, which at their side are attached to the arms 7 schematically shown, are at their sides facing away from the roller cylinder 5 mounted on angled arms 9 and 10. The lower arm 9 is mounted on the frame 12 of the agricultural machine 1. The upper arm 10 is mounted at one end of the adjustment means in the form of a crank or rigging screw 13, the other end of which is attached to the frame 12 of the agricultural machine 1. Each band ring 6 consists of at least two band ring segments 14 including an outer, substantially circular portion 15, an inner circular portion 16, which is constructed to encircle substantially half the circumference of the centre axis 17 of the roller cylinder 5, and a radial portion 18 extending substantially radially from the outer circular portion 15 to the inner circular portion 16. The bending radius of the outer circular portion 15 substantially coincides with the centre of the centre axis 17. The inner circular portion 16 may have another shape if the centre axis in cross-section has another shape but a circular shape. For instance, the centre axis may consist of a solid axis with an arbitrary cross-section or a tube with several corners such as a square tube, wherein the inner portion 16 may then be designed with parts which are perpendicular to each other. The inner portion 18 shall abut the centre axis 17 at least at the attachment points between the inner portion and the centre axis. However, the inner portion 18 preferably is form-fit adapted to the shape of an inner jacket surface of the centre axis 17. The inner portion 16 may extend in the same direction or in the opposite direction in relation to the extension of the outer portion from the radial portion 18. It is also clear from FIG. 2 how the different band ring segments 14 are kept together by common screws 19 and 20, which are brought through holes provided partly at the opposite ends of the circular portion 16, partly through the centre axis 17 of the roller cylinder 17. The screws 19, 20 are brought through the holes in two opposite inner portions 16 of two band ring segments 14. The screws 19, 20 are displaced in relation to each other in the longitudinal direction of the centre axis 17, which in turn implies that the holes in the inner portions 16 of the band ring segments 14 for the screws 19, 20 are displaced in relation to each other in the longitudinal direction of the centre axis 17. Despite this location of the holes for the screws 19, 20, all band ring segments 14, which constitute parts of each band ring 6 on the centre axis, may be manufactured so that they are identical. In a preferred embodiment of the invention, the screws are brought substantially through the centre of the centre axis 17. In this way, the holes extend substantially perpendicularly through the jacket surface of the centre axis 17 and the abutment for the screw head and nuts of the screws will be favourable, see FIGS. 2, 3A and 3E, i.e. full abutment around the holes in the inner portions 16. Through its constructive structure with the band ring segments 14 according to the invention the roller cylinder 15 according to the invention will be flexible at uneven grounds and at the presence of stones. The rings 6 of the roller cylinder may get different properties depending on the choice of material. Further, the roller may be given an appropriate shape, in which a spring system is included in a manner known per se. A rubber spring system according to FIG. 1 may be very suitable.

FIGS. 3A-D show some different embodiments of the band ring 6 with band ring segments 14.

FIG. 3A shows a ring 6A, the outer circular portions of which overlap each other. The ring 6A is manufactured of spring steel or flat bar steel without profiling. This ring will become flexible but may carry small loads and will become more sensitive to stone collisions.

FIG. 3B shows the band ring segments 14 of the ring 6 and the centre axis 17 separated to clarify the construction. The radial portion 18 and the outer circular portion 15 of each band ring segment 14 are constructed with double layers as is shown in FIG. 1.

FIG. 3C shows an embodiment where the band segments 14 are joined so that the free end of the outer circular portion 15 is attached to the corresponding half at 21 with an indicated joint, such screws, rivets, etc. By joining the segments, the ring will be very stiff and may carry considerable loads.

FIG. 3D shows an embodiment of the ring, where the free end of the outer circular portion 15 overlaps and is situated at a distance of the adjacent band ring segment 14 at 22. This implies that the ring 6 is flexible and has a larger ability to run clean during difficult condition. This embodiment may be the same as in FIG. 3 but with the only difference that the band ring segments 14 are not joined. Depending on how large the distance between the band ring segments 14 is made, the segments will spring when the roller rolls on the ground and hence the prerequisites to use the machine during wet conditions increase.

FIG. 3E shows an embodiment of the invention, where the ring 6a is divided into three band ring segments 14a, which have been joined by being screwed to the centre axis 17a in a similar manner as described above with reference to FIG. 2. It can here be seen that also with more segments than two, screws 19a, 20a and 21a may be brought substantially through the centre of the centre axis. By dividing the ring 6a into smaller segments, the stiffness of the ring increases and it will be more cost efficient to change smaller segments upon wear. Also in this embodiment, the band ring segments may be joined at their outer portions as is shown in the embodiment in FIG. 3C.

FIG. 3F shows an embodiment of the invention, where the ring 6b, as in FIG. 3E, has been divided into three band ring segments 14b, which are joined by being screwed to the centre axis 17b by means of screws 19b, 20b, and 21b. In this embodiment, the screws are not brought through the centre of the centre axis, as they are brought through holes at the ends of the inner portion. This results in a good securing of the inner portions of the band ring segments, but the screws are here inserted through holes in the centre axis 17b, which are not perpendicular to the jacket surface of the centre axis.

FIGS. 4A-D show some different ring profiles which may be suitable. FIG. 4A shows an embodiment which has a small contact surface against the ground. FIGS. 4B and C show an embodiment of the ring profile with a surface, which is concave radially outwards, to which earth easily sticks. This implies that earth remains in the outwardly concave surface of the ring during its rotation without agglomerating so much that the diameter of the ring increases in an extent worth mentioning and the working depth of the machine consequently decreases. Often, a limited earth layer adheres in the concave outer space of the ring, which implies that the wear of the band ring will be minimal. This embodiment is suitable in certain areas and types of earth.

FIG. 4D shows how the different segments are located in relation to each other in case the ring is manufactured so that there is a predetermined distance between the band ring segments 14. See section II-II in FIG. 3D.

FIG. 5 shows a roller cylinder provided with band rings. This may also be provided with scrapers, not shown, which contribute to keep the roller cylinder clean at moist conditions. The scrapers may in a manner known per se consist of scraper plates, which are interposed substantially radially between adjacent band rings.

The invention may be varied in a number of different ways within the scope of the enclosed claims, even if the embodiments described above are to prefer.

The invention claimed is:

1. A roller cylinder comprising
band rings, which are attached to a centre axis, the centre axis having a longitudinal direction that is oblique to the band rings,
said band rings comprising at least two band ring segments consisting of an outer, substantially circular portion, an inner portion and a radial portion extending substantially radially between the inner and outer portions,
said inner portions of the band ring segments being fixed by screw or bolt joints, at the centre axis and abuts the centre axis at least at the attachment points of the screw and bolt joints between the inner portion of the band ring segments and the centre axis,
wherein each said screw or bolt joint passes through a hole in one said inner portion of a band ring segment, extending through the centre of the centre axis and completely through said centre axis,
wherein the free end of the outer portions of each band ring segment overlaps an opposite end of the outer portion of the adjacent band ring segment to form an overlapping place,
wherein the adjacent band ring segments are fixed to each other by means of a fastening device at the overlapping place.

2. A roller cylinder according to claim 1, wherein each said screw or bolt joint passes through respective opposing holes of two opposite inner portions of the band ring segments.

3. A roller cylinder according to claim 1, wherein the inner portion of the band ring segments having a curved surface that matches a part of an outer surface of the centre axis and is attached thereto, said centre axis having a circular cross-section.

4. A roller cylinder according to claim 1, wherein two said band ring segments are attached to the centre axis, each one by means of a screw or bolt joint, wherein each inner portion of the band ring segments encircles substantially half the circumference of the centre axis.

5. A roller cylinder according to claim 1, wherein at least three band ring segments are attached to the centre axis, each one by means of a screw or bolt joint, wherein each inner portion of the band ring segments encircles part of the circumference of the centre axis (17).

6. A roller cylinder (1) according to claim 1, wherein each band ring segment (14, 14a, 14b) is made in one piece.

7. A roller cylinder according to claim 1, wherein the free end of the outer portions of each band ring segment overlaps the opposite end of adjacent band ring segments, said adjacent band ring segments forming a gap between each other at the overlapping place.

8. A roller cylinder (1) according to claim 1, wherein each inner portion has two holes for receiving the screw or bolt joints, and that said holes are displaced in relation to each other in the longitudinal direction of the centre axis.

9. A roller cylinder according to claim 1, wherein the outer portions of the band ring segments have a bending centre that substantially coincides with the centre of the centre axis.

10. A roller cylinder according to claim 1, wherein the cross-section of the outer portion of at least one of said band ring segments is concave or concavely angled, seen radially outwards.

11. A roller cylinder according to claim 10, wherein the inner portion is arranged to be adapted to part of the jacket surface of the centre axis.

12. A roller cylinder according to claim 2, wherein the inner portion of the band ring segments has a curved surface that matches a part of the surface of the centre axis and is attached thereto, said centre axis having a circular cross-section.

13. A roller cylinder according to claim 2, wherein two said band ring segments are attached to the centre axis, each one by means of a screw or bolt joint, wherein each inner portion of the band ring segments encircles substantially half the circumference of the centre axis.

14. A roller cylinder according to claim 3, wherein two said band ring segments are attached to the centre axis, each one by means of a screw or bolt joint, wherein each inner portion of the band ring segments encircles substantially half the circumference of the centre axis.

15. A roller cylinder according to claim 2, wherein at least three band ring segments are attached to the centre axis, each one by means of a screw or bolt joint, wherein each inner portion of the band ring segments encircles part of the circumference of the centre axis.

16. A roller cylinder according to claim 3, wherein at least three band ring segments are attached to the centre axis, each one by means of a screw or bolt joint, wherein each inner portion of the band ring segments encircles part of the circumference of the centre axis.

17. A roller cylinder according to claim 2, wherein each band ring segment is made in one piece.

18. A roller cylinder according to claim 3, wherein each band ring segment is made in one piece.

* * * * *